US012644349B2

(12) United States Patent
    Calleri

(10) Patent No.:    US 12,644,349 B2
(45) Date of Patent:         Jun. 2, 2026

(54) SUCTION DEVICE FOR DRILLING MUD

(71) Applicant: Geolog S.R.L., San Giuliano Milanese (IT)

(72) Inventor: Antonio Calleri, San Giuliano Milanese (IT)

(73) Assignee: Geolog S.R.L., San Giuliano Milanese (IT)

( * ) Notice: Subject to any disclaimer, the term of this patent is extended or adjusted under 35 U.S.C. 154(b) by 222 days.

(21) Appl. No.: 18/526,174

(22) Filed: Dec. 1, 2023

(65) Prior Publication Data

US 2025/0122769 A1      Apr. 17, 2025

(30) Foreign Application Priority Data

Dec. 2, 2022    (IT) .......................... 102022000024894

(51) Int. Cl.
    E21B 21/06          (2006.01)
    B01D 29/46          (2006.01)
(52) U.S. Cl.
    CPC .............. E21B 21/06 (2013.01); B01D 29/46 (2013.01)
(58) Field of Classification Search
    None
    See application file for complete search history.

(56) References Cited

U.S. PATENT DOCUMENTS 664,833 A  *  1/1901  Collins .................. B01D 29/33
                                                      166/170
704,012 A  *  7/1902  Emerson ............... B01D 29/111
                                                      48/144

1,414,120 A  *  4/1922  Fulcher .................. B01D 29/46
                                                      210/357
1,581,998 A  *  4/1926  Fulcher .................. B01D 25/00
                                                      210/357
1,657,346 A  *  1/1928  Cuno ..................... B01D 29/46
                                                      210/357
1,673,743 A  *  6/1928  Fulcher .................. B01D 29/70
                                                      210/357
1,719,346 A  *  7/1929  Thomas ................. B01D 29/46
                                                      210/357

(Continued)

FOREIGN PATENT DOCUMENTS

CN          102580360 B      5/2015
IT    102011901933820 A1    10/2012

*Primary Examiner* — Robert J Popovics
(74) *Attorney, Agent, or Firm* — Workman Nydegger

(57)          ABSTRACT

Suction device for subsoil drilling rigs includes: a main body, having at least one internally hollow cylindrical body; a rotary actuator associated with the main body; a rotation shaft extending within the cylindrical body. The rotation shaft is interlocked with the rotary actuator and has an end portion axially protruding from the cylindrical body. The device further includes a terminal element, mounted on the end portion of the rotation shaft and having a plurality of circumferential openings putting the inside of the cylindrical body in fluidic communication with the outside environment. The suction device further includes a cleaning device. The cleaning device includes a plurality of protrusions substantially integral with the cylindrical body; each protrusion extends into a respective one of the openings, thus cleaning such openings during a rotation of the terminal element.

12 Claims, 7 Drawing Sheets

(56) References Cited

U.S. PATENT DOCUMENTS

| 1,754,728 | A | * | 4/1930 | Thomas | B01D 25/38 |
| | | | | | 210/357 |
| 1,757,153 | A | * | 5/1930 | Thomas | B01D 25/38 |
| | | | | | 210/357 |
| 1,852,873 | A | * | 4/1932 | Berger | B01D 29/46 |
| | | | | | 210/357 |
| 1,926,557 | A | * | 9/1933 | Perkins | B01D 29/6476 |
| | | | | | 210/357 |
| 1,938,934 | A | * | 12/1933 | Scott | B01D 29/46 |
| | | | | | 210/357 |
| 1,960,303 | A | * | 5/1934 | Durdin, Jr. | E02B 8/026 |
| | | | | | 210/174 |
| 1,979,200 | A | * | 10/1934 | Hoare | B01D 25/38 |
| | | | | | 210/357 |
| 1,987,597 | A | * | 1/1935 | Cuno | B01D 25/30 |
| | | | | | 210/167.04 |
| 2,022,017 | A | * | 11/1935 | Wardle | B01D 25/34 |
| | | | | | 210/357 |
| 2,029,611 | A | * | 2/1936 | Chewning | B01D 29/64 |
| | | | | | 210/357 |
| 2,078,524 | A | * | 4/1937 | Ashton | B01D 35/14 |
| | | | | | 210/240 |
| 2,085,326 | A | * | 6/1937 | Nordell | B02C 18/0092 |
| | | | | | 210/174 |
| 2,100,482 | A | * | 11/1937 | Irwine | B01D 33/073 |
| | | | | | 210/497.1 |
| 2,227,344 | A | * | 12/1940 | Hartmann | B01D 25/34 |
| | | | | | 210/357 |
| 2,241,587 | A | * | 5/1941 | Durdin, Jr. | B02C 18/0092 |
| | | | | | 241/46.06 |
| 2,273,405 | A | * | 2/1942 | Hochn | B02C 13/14 |
| | | | | | 241/73 |
| 2,289,539 | A | * | 7/1942 | Cuno | B01D 29/46 |
| | | | | | 222/510 |
| 2,298,865 | A | * | 10/1942 | Beldam | B01D 29/46 |
| | | | | | 210/357 |
| 2,305,935 | A | * | 12/1942 | Thom | B02C 18/0092 |
| | | | | | 241/46.01 |
| 2,320,514 | A | * | 6/1943 | Durdin, Jr. | B02C 18/0092 |
| | | | | | 210/174 |
| 2,365,525 | A | * | 12/1944 | Cox | B01D 25/34 |
| | | | | | 210/357 |
| 2,440,384 | A | * | 4/1948 | Schenke | B01D 29/6476 |
| | | | | | 210/415 |
| 2,453,622 | A | * | 11/1948 | English | B01D 29/46 |
| | | | | | 210/357 |
| 2,465,579 | A | * | 3/1949 | Eduards | B01D 29/46 |
| | | | | | 210/488 |
| 2,553,567 | A | * | 5/1951 | Fette | C12C 7/24 |
| | | | | | 210/414 |
| 2,594,785 | A | * | 4/1952 | Meeker | B02C 18/0092 |
| | | | | | 210/415 |
| 2,668,623 | A | * | 2/1954 | Munroe | B01D 29/46 |
| | | | | | 210/171 |
| 2,814,389 | A | * | 11/1957 | Hoare | B01D 25/34 |
| | | | | | 210/357 |
| 2,921,683 | A | * | 1/1960 | Strenz | B02C 13/26 |
| | | | | | 210/174 |
| 3,247,970 | A | * | 4/1966 | Jellesma | B01D 29/6476 |
| | | | | | 210/174 |
| 3,342,341 | A | * | 9/1967 | Lee | E03D 5/016 |
| | | | | | 210/357 |
| 3,785,574 | A | * | 1/1974 | Rosenquest, Jr. | F04D 11/005 |
| | | | | | 241/46.11 |
| 3,843,062 | A | * | 10/1974 | Neidl | B01D 35/26 |
| | | | | | 241/46.11 |
| 3,976,252 | A | * | 8/1976 | PerDue | B02C 18/0092 |
| | | | | | 241/46.11 |
| 4,146,481 | A | * | 3/1979 | Nagatoshi | B01D 33/275 |
| | | | | | 210/488 |
| 4,147,633 | A | * | 4/1979 | Kato | B01D 33/275 |
| | | | | | 210/488 |
| 4,186,888 | A | * | 2/1980 | Galanty | B02C 18/0092 |
| | | | | | 241/46.06 |
| 4,220,540 | A | * | 9/1980 | Hagihara | B01D 29/33 |
| | | | | | 210/415 |
| 4,237,978 | A | * | 12/1980 | Calderon | E21B 37/08 |
| | | | | | 166/170 |
| 4,491,278 | A | * | 1/1985 | Galanty | B02C 18/0092 |
| | | | | | 241/46.06 |
| 4,519,906 | A | * | 5/1985 | Hikosaka | B41F 31/00 |
| | | | | | 210/259 |
| 4,585,553 | A | * | 4/1986 | Hikosaka | B03C 1/30 |
| | | | | | 210/111 |
| 5,186,401 | A | * | 2/1993 | Herdman | B02C 18/0092 |
| | | | | | 241/285.2 |
| 5,242,124 | A | * | 9/1993 | Latzel | F04D 29/2288 |
| | | | | | 241/46.11 |
| 5,505,388 | A | * | 4/1996 | Chambers | B02C 23/08 |
| | | | | | 241/46.06 |
| 5,582,727 | A | * | 12/1996 | Foster | B01D 21/2488 |
| | | | | | 209/322 |
| 5,833,152 | A | * | 11/1998 | Galanty | B02C 18/0092 |
| | | | | | 241/73 |
| RE37,349 | E | * | 9/2001 | Chambers, Sr. | B02C 18/0092 |
| | | | | | 241/46.06 |
| 6,311,905 | B1 | * | 11/2001 | Galanty | B02C 18/24 |
| | | | | | 241/46.06 |
| 6,332,545 | B1 | * | 12/2001 | Izumi | B01D 33/275 |
| | | | | | 210/488 |
| 6,564,948 | B2 | * | 5/2003 | Izumi | B01D 33/067 |
| | | | | | 210/488 |
| 6,796,435 | B2 | * | 9/2004 | Izumi | B01D 33/073 |
| | | | | | 210/488 |
| 6,830,207 | B2 | * | 12/2004 | Galanty | B02C 18/0092 |
| | | | | | 241/73 |
| 6,938,845 | B2 | * | 9/2005 | Galanty | B02C 18/0092 |
| | | | | | 241/46.06 |
| 7,083,735 | B2 | * | 8/2006 | Laing | B01D 29/902 |
| | | | | | 210/791 |
| 8,727,248 | B2 | * | 5/2014 | Galanty | F04D 7/045 |
| | | | | | 241/46.06 |
| 12,083,526 | B1 | * | 9/2024 | Nassef | B01F 27/90 |
| 2013/0032527 | A1 | * | 2/2013 | Calleri | B01D 29/6476 |
| | | | | | 210/407 |
| 2015/0367261 | A1 | * | 12/2015 | Calleri | B01D 29/6476 |
| | | | | | 210/403 |
| 2025/0122769 | A1 | * | 4/2025 | Calleri | E21B 21/06 |

* cited by examiner 520
520
520
520
521
530
523
522

520'
510
510
530
510
520"
521
522

SUCTION DEVICE FOR DRILLING MUD

CROSS-REFERENCE TO RELATED APPLICATIONS

This application claims priority to Italian Application No. 102022000024894, filed Dec. 2, 2022, which is incorporated herein by specific reference.

BACKGROUND OF THE INVENTION

1. The Field of the Invention

The present invention relates to a suction device for drilling muds.

The present invention also relates to a survey system comprising said suction device.

The present invention further relates to a drilling rig comprising said survey system.

2. The Relevant Technology

As is known, when drilling a well (e.g., for extracting hydrocarbons and/or geothermal resources), a fluid called drilling mud is made to circulate within the borehole.

The purpose of using drilling mud is to lubricate and cool the drill bit, as well as to maintain an adequate hydrostatic pressure within the borehole.

The drilling mud is fed through the hollow interior of the drill string and flows back up through the annular space (called "annulus") delimited by the outer surface of the drill bit and the inner surface of the well. After having reached the surface, the returning mud flows along a return tube, also known as "flow line", at the end of which the solid debris dragged by the mud is separated from the fluidic component.

The fluidic component is then fed back into the tanks it was in before circulating in the well, so that it can be reused.

As the mud flows in the return tube, a part of the fluidic component is taken by a pump associated with a suitable filter and fed into a degasser, where the gas dissolved in the mud is extracted.

The volatile components extracted by the degasser are then analyzed in order to obtain information about the characteristics of any hydrocarbon resources, more generally gases, that may be present in the subsoil.

In order to remove a fraction of the drilling mud, from which gas can be extracted and then analyzed, a suction device is used which is provided with a terminal portion that is immersed in the returning mud flow and then permits conveying some mud towards the degassing and analysis equipment.

Such terminal portion has a substantially cylindrical shape and is provided with a series of circumferential openings; the latter perform the task of filtering larger cuttings and letting through, almost exclusively, the fluidic component. The terminal part is fixed, i.e., integral with the remaining part of the structure of the suction device.

Because of the large quantity of debris in the returning mud flow, the openings are at risk of frequent obstruction, whether partial or full, which might limit or adversely affect the proper operation of the survey and analysis system.

In order to prevent this problem, the prior art provides cleaning devices formed of a plurality of plate-shaped elements, fitted to a motorized shaft and equipped with one or more radial extensions. The motorized shaft extends axially along said terminal portion of the suction device; the radial extensions go through the openings from the inside out. As the motorized shaft rotates, the plate-shaped elements slide within the openings to remove any accumulated debris.

SUMMARY OF THE INVENTION

The Applicant observed that such plate-shaped elements, and particularly the extensions thereof performing the task of cleaning the openings, are subject to premature wear, to such an extent that they can no longer perform their function effectively, thus demanding manual cleaning by an operator.

In light of the above, the Applicant's goal was to provide a suction device for drilling muds which could operate correctly for a longer time than prior-art probes.

More specifically, the object of the present invention is to provide a suction device wherein the openings through which the drilling mud is taken will remain unobstructed, and hence fully operational, for a long time without requiring operator intervention.

In accordance with a first aspect, the invention relates to a suction device for drilling muds.

Preferably, the suction device comprises a main body.

Preferably, the main body has at least one internally hollow cylindrical body.

Preferably, the suction device comprises a rotary actuator associated with said main body.

Preferably, the suction device comprises a rotation shaft.

Preferably, the rotation shaft extends within said cylindrical body.

Preferably, said rotation shaft is interlocked with said rotary actuator.

Preferably, an end portion of said rotation shaft protrudes axially from said cylindrical body.

Preferably, the suction device comprises a terminal element.

Preferably, the terminal element is mounted on the end portion of said rotation shaft.

Preferably, the terminal element has a plurality of circumferential openings putting the inside of said cylindrical body in fluidic communication with the outside environment.

Preferably, the suction device comprises a cleaning device.

Preferably, the cleaning device comprises a plurality of protrusions.

Preferably, the protrusions are substantially integral with said cylindrical body.

Preferably, each protrusion extends into a respective one of said openings.

Preferably, each protrusion cleans a respective one of said openings during a rotation of said terminal element.

In accordance with a second aspect, the invention relates to a survey system for subsoil drilling rigs.

Preferably, the system comprises said suction device.

Preferably, the system comprises a degassing device.

Preferably, said degassing device is configured to receive drilling fluid from the suction device.

Preferably, said degassing device is configured to separate, in said drilling fluid, a gaseous component and a substantially liquid part.

Preferably, the system comprises one or more analysis devices.

Preferably, said one or more analysis devices are configured to receive said gaseous component.

Preferably, said one or more analysis devices are configured to execute analyses on said gaseous component.

In accordance with a further aspect, the invention relates to a subsoil drilling rig.

Preferably, the rig comprises a support structure.

Preferably, the rig comprises a motorized member.

Preferably, the rig comprises a drill bit.

Preferably, the drill bit is rotatably activated by said motorized member in order to drill a well.

Preferably, the rig comprises a structure of pipes.

Preferably, the structure of pipes connects said motorized member to said drill bit.

Preferably, the rig comprises a feeding structure for causing a drilling fluid to flow into said well through said pipes.

Preferably, the rig comprises a return duct in which said drilling fluid flows as it returns from said well.

Preferably, the rig comprises said survey system.

Preferably, said terminal element is immersed in said drilling fluid returning from said well.

In accordance with one or more of the above aspects, the invention may comprise one or more of the following features.

Preferably, said suction device comprises a suction member.

Preferably, the suction member is associated with said main body for sucking drilling fluid into said cylindrical body through said circumferential openings.

Preferably, said suction member is configured to suck in said drilling fluid when said terminal element is immersed in said drilling fluid.

Preferably, said terminal element comprises a plurality of coaxial rings.

Preferably, said terminal element comprises a supporting wall to which said rings are fixed.

Preferably, said rings are mutually spaced apart so as to define said circumferential openings.

Preferably, said terminal element comprises a closing element.

Preferably, the closing element is mounted on the side of said rings opposite said cylindrical body.

Preferably, said coaxial rings and said supporting wall are made as one piece.

Preferably, said supporting wall extends, with reference to said cylindrical body, parallel to the longitudinal development of said rotation shaft between a proximal ring and a distal ring of said coaxial rings.

Preferably, said supporting wall has, in a plan view, a curved shape which matches a radially internal profile of said coaxial rings.

Preferably, said rotary actuator is an electric motor.

Preferably, the suction device comprises a supporting flange extending radially from an axially terminal portion of said cylindrical body.

Preferably, said cleaning device comprises a supporting element fixed to said supporting flange.

Preferably, said protrusions extend from said supporting element.

Preferably, said protrusions extend radially into said circumferential openings.

Preferably, said protrusions extend into said circumferential openings in one same radial direction.

BRIEF DESCRIPTION OF THE DRAWINGS

Further features and advantages will become more apparent in the light of the following detailed description of a preferred, but non-limiting, embodiment of the invention. Such description is provided herein with reference to the annexed drawings, which are also supplied by way of non-limiting example, wherein.

DETAILED DESCRIPTION OF THE PREFERRED EMBODIMENTS

Figure 1:
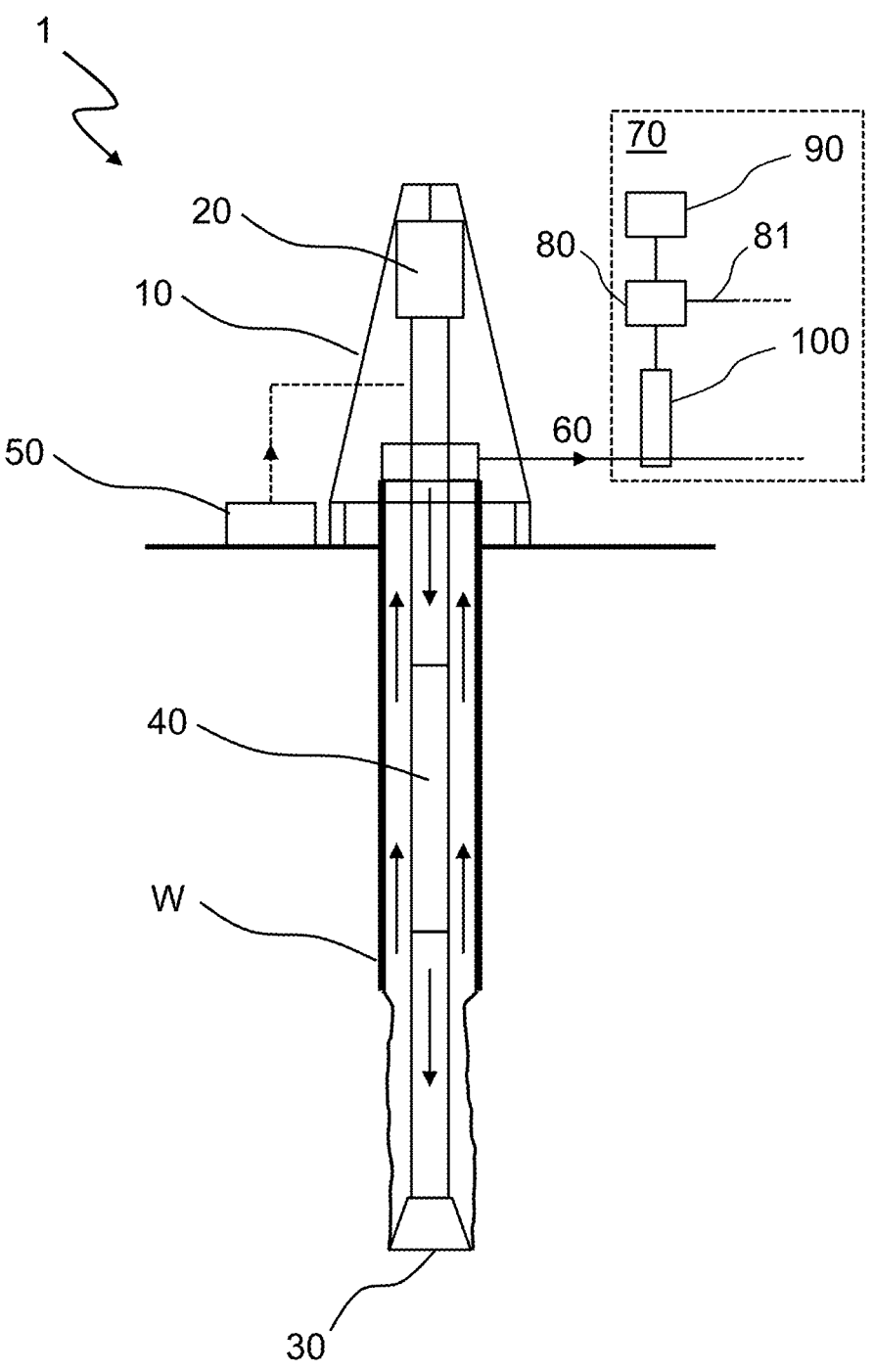
FIG. 1 schematically shows a drilling rig according to the present invention.

Reference numeral 1 designates as a whole a subsoil drilling rig in accordance with the present invention.

The rig 1 (FIG. 1) comprises a support structure 10 and a motorized member 20 mounted on said support structure 10. In particular, the motorized member 20 may be constrained to the support structure 10 by means of a hook, which allows it to translate along a substantially vertical axis. The rotary motion generated by the motorized member 20 is transferred to a drill bit 30 via a structure of pipes 40. The pipes 40 preferably consist of tubular sections with threaded ends which, being assembled according to a predefined longitudinal development, allow the drill bit 30 to reach depths as low as a few thousands of metres while continuing to rotate about its own longitudinal axis.

The assembly consisting of the drill bit 30 and the pipes 40 will hereinafter be referred to as "drill string".

In order to perform the drilling operation, a drilling fluid is fed into the drill string. The fluid is pumped through the pipes 40 and reaches the drill bit 30. In particular, the rig 1 comprises a feeding structure 50 for delivering the drilling fluid into the well W through the pipes 40.

In a per se known manner, the drilling fluid may be a so-called drilling mud.

When it arrives at the terminal part of the drill bit 30, the mud flows back up the borehole W through the so-called "annulus", thus returning to the top opening near the support structure 10.

In FIG. 1, the downward pointing arrows within the pipes 40 represent the mud flow towards the drill bit 30, while the upward pointing arrows, outside the pipes, represent the mud flow returning to the surface.

The rig 1 comprises also a return duct 60, through which the returning mud flows towards vibrating sieves (not shown), where it is separated from the solid cuttings, optionally analyzed, and then stored for reuse, if necessary. From a practical viewpoint, the return duct is—or is part of—the so-called "flow line".

Note that in FIG. 1 the above-described elements are depicted in a schematic manner, without necessarily observing the actual proportions among the dimensions of such elements.

Note also that, in the present context, the terms "upstream" and "downstream" should be understood with reference to the direction of the mud flow.

The operation of the rig 1 is, in general, per se known and will not therefore be described any further.

The rig 1 comprises a survey system 70.

First and foremost, the survey system 70 comprises a suction device 100. As will become apparent below, the suction device 100 has a part immersed in the returning mud flow, for removing some mud to be subjected to analyses by means of other equipment.

The system 70 further comprises a degassing device 80, configured to receive the drilling fluid from the suction device 100 and separate, in such drilling fluid, a gaseous component and a substantially liquid component. In practical terms, the degassing device 80 (commonly known as "degasser") extracts the gaseous component from the drilling fluid and lets the remaining part (which is substantially liquid and includes the so-called cuttings, i.e., residues of rocky material produced during the drilling process) return into the main duct 60 through a drain duct 81.

The system 70 further comprises one or more analysis devices 90, configured to receive the gaseous component of the drilling fluid taken by the suction device 100 and to execute analyses on such gaseous component.

The degassing device 80 and the analysis devices 90 are also per se known and require no further description.

Figure 2:
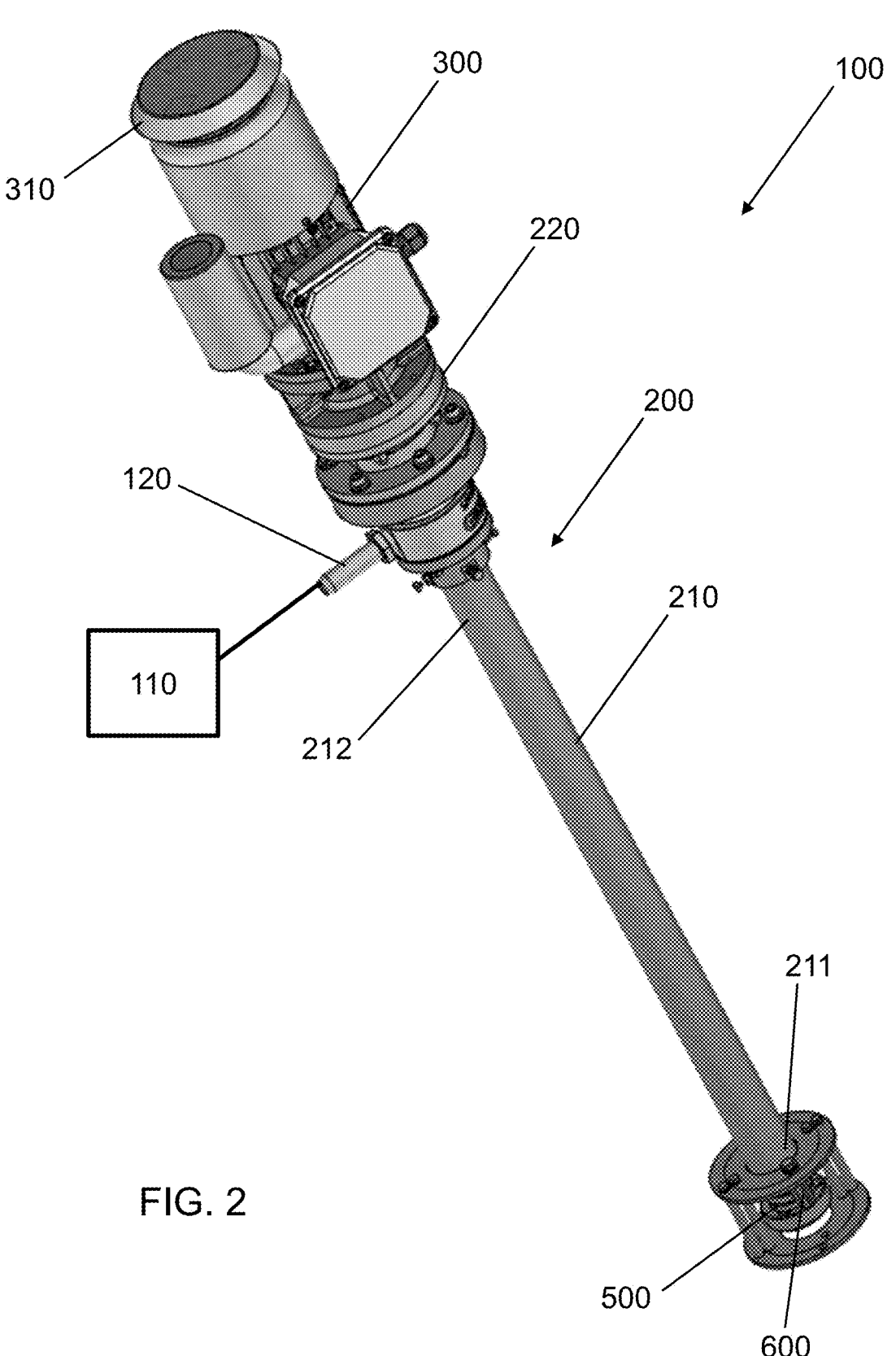
FIG. 2 is a perspective view of a suction device in accordance with the present invention.

FIG. 2 shows the suction device 100.

The suction device 100 comprises a main body 200.

The main body 200 comprises an internally hollow cylindrical body 210. As will become apparent below, the drilling fluid sucked by the suction device 100 flows within the cylindrical body 210 under the action exerted by the suction member 110.

The suction device 100 comprises a rotary actuator 300. The rotary actuator 300 is, preferably, an electric motor.

In particular, the rotary actuator 300 may be a single-phase electric motor.

In one embodiment, the rotary actuator 300 may be coupled to a reduction gearbox for connecting to the rotation shaft 400, which will be described hereinafter.

The Applicant observes that the rotary actuator 300, implemented as an electric motor, provides high torque and the correct revolution speed. This makes the cleaning operation, performed under the action of such motor, particularly effective especially in the presence of stuck residues that may form when the suction device 100 remains inoperative for some time.

The characteristics of the electric motor are preferably suited to the location where the suction device 100 is to be installed (e.g., operating frequency of 50 Hz or 60 Hz).

In one embodiment, the main body 200 comprises a reduction gear 220, interposed between the rotary actuator 300 and the cylindrical body 210.

In one embodiment, the suction device 100 comprises a covering element 310, mounted on top of the rotary actuator 300. Since the suction device 100 is designed also for outdoor service, the covering element 310 is useful to protect the rotary actuator 300 against atmospheric agents (typically rain).

As mentioned above, the suction device 100 comprises a rotation shaft 400.

The rotation shaft 400 extends within the cylindrical body 210. The rotation shaft 400 is interlocked with the rotary actuator 300, which causes it to rotate about its longitudinal axis.

Figure 3:
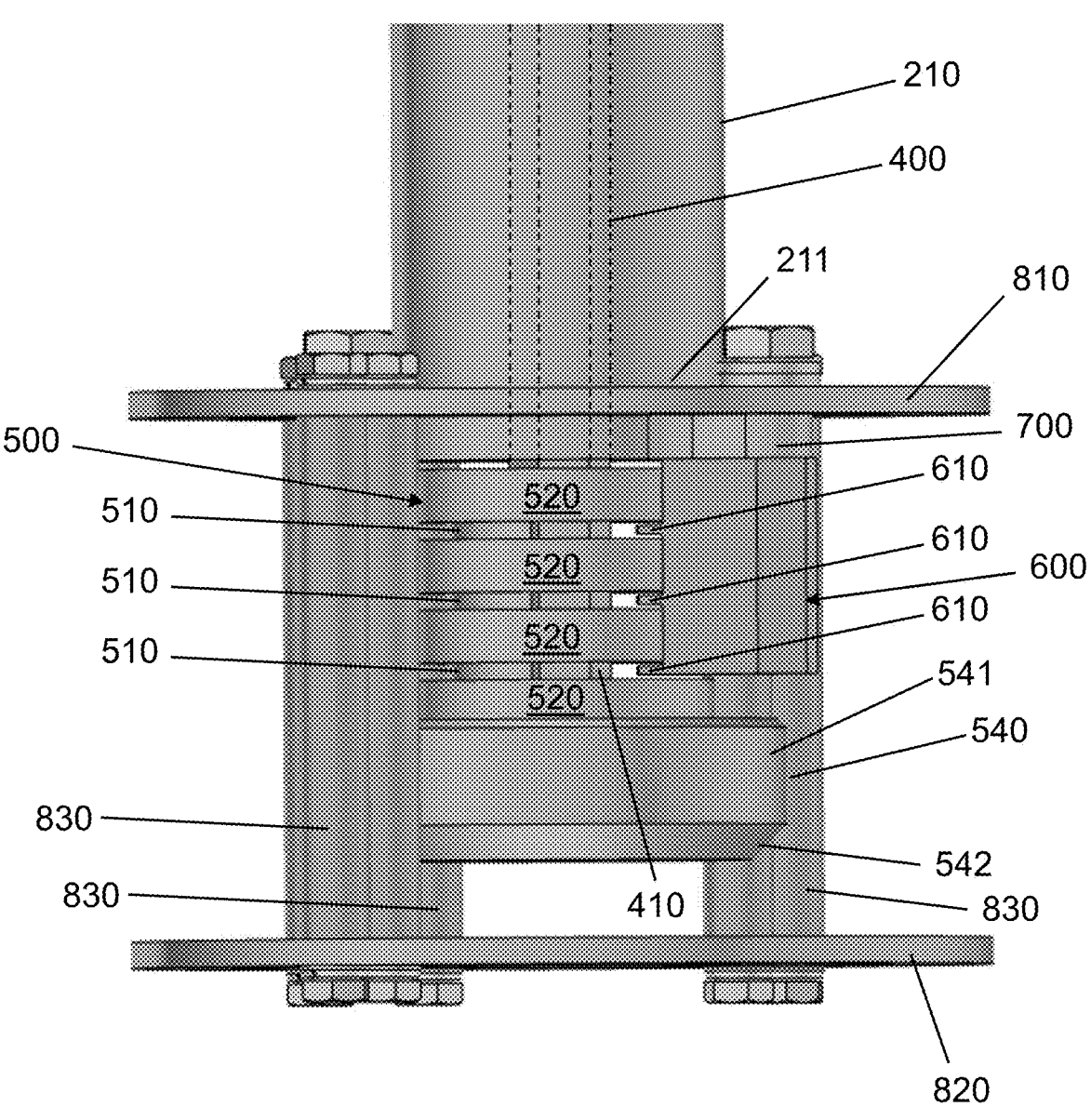
FIG. 3 is a front view of a detail of the suction device of FIG. 2.
Figure 4:
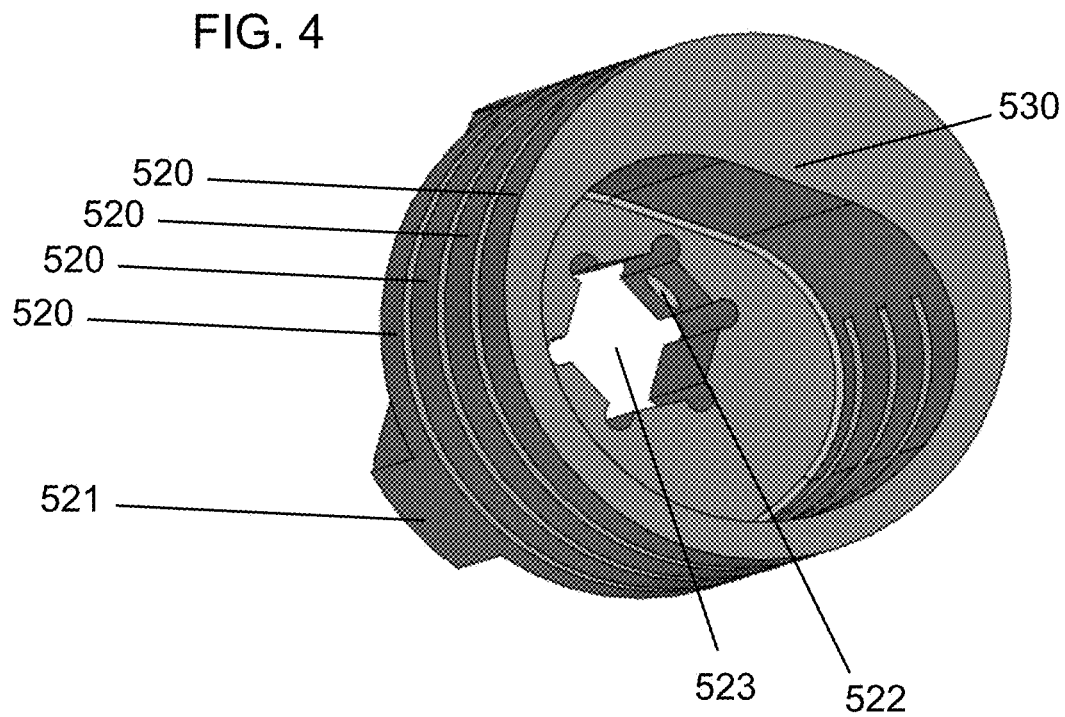
FIGS. 4-6 are perspective views, from different angles, of a component of the suction device of FIG. 2.
Figure 5:
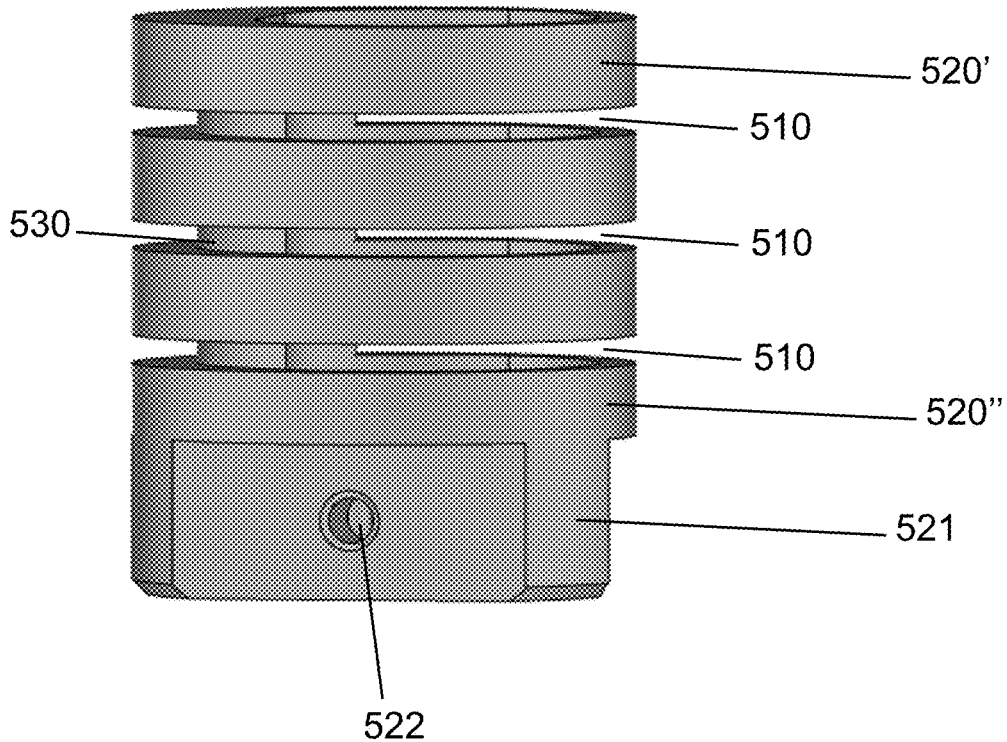
Figure 6:
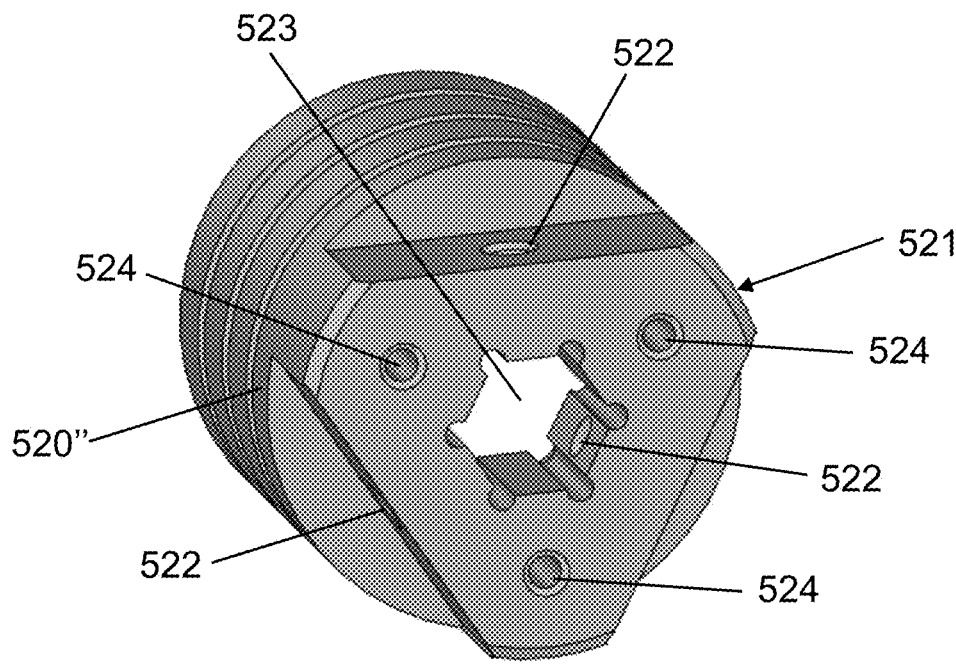

An end portion of the rotation shaft 400 protrudes axially from the cylindrical body 210 (FIG. 3).

The end portion 410 of the rotation shaft 400 protrudes from a first axially terminal portion 211 of the cylindrical body 210.

Preferably, the rotation shaft 400 has a substantially hexagonal cross-section.

The connection between the rotary actuator 300 and the rotation shaft 400 is per se known and will not therefore be described any further.

Preferably, the rotary actuator 300 is associated, whether directly or via other components, with a second axially terminal portion 212 of the cylindrical body 210, opposite the first axially terminal portion 211.

The suction device 100 comprises a terminal element 500, mounted on the end portion 410 of the rotation shaft 400.

The terminal element 500 is, therefore, located in proximity to the first axially terminal portion 211 of the cylindrical body 210.

Preferably, the terminal element 500 is integral with the end portion 410 of the rotation shaft 400. Therefore, the terminal element 500 turns integrally with the rotation shaft 400.

The terminal element 500 (FIGS. 2-6, 8-10) has a plurality of circumferential openings 510 putting the inside of the cylindrical body 210 in fluidic communication with the outside environment. From a practical viewpoint, the outside environment may consist of said return duct (flow line) or another duct associated therewith, so that the terminal element 500 will stay immersed in a flow of returning fluid and be able to take a part of it through the openings 510.

In more detail, the terminal element 500 comprises a plurality of coaxial rings 520. The rings 520 are coaxially arranged around the end portion 410 of the rotation shaft 400.

The rings 520 are mutually spaced apart so as to define said circumferential openings 510.

Preferably, each one of the openings 510 extends along the entire circumference of the terminal element 500. A part of each opening 510 may be closed internally by a supporting wall, which will be further described below. Each opening 510 has, nevertheless, a continuous circumferential development, so as to not collide with the protrusions 610 of the cleaning device 600, which will be described later on.

Preferably, each opening 510 has a planar extension that is substantially parallel to the other openings 510.

Preferably, each opening 510 has a planar extension that is substantially orthogonal to the axis of rotation of the rotation shaft 400.

The terminal element 500 further comprises a supporting wall 530 to which said rings 520 are fixed.

Preferably, the rings 520 are all substantially equal.

Preferably, the rings 520 are substantially parallel to one another.

The rings 520 are arranged in succession, from a proximal ring 520' (i.e., the one closest to the cylindrical body 210) to a distal ring 520" (i.e., the one farthest from the cylindrical body 210).

The supporting wall 530 extends, in the axial direction, parallel to the longitudinal development of the rotation shaft 400, between the proximal ring 520' and the distal ring 520".

In a plan view, the supporting wall 530 has a curved shape which matches the radially internal profile of the rings 520. In this regard, see the dashed line X in FIG. 10, which represents the (at least theoretical) delimitation between the supporting wall 530 and the rings 520. Note that, preferably, the supporting wall and the rings 520 are made as one piece; therefore, the dashed line in FIG. 10 may simply represent the theoretical subdivision between portions of the same physical piece.

Preferably, the terminal element 500 is provided with an engagement portion 521 (FIGS. 4-6, 8).

The engagement portion 521 extends axially from the distal ring 520'', on the side opposite the other rings 520.

The engagement portion 521 is shaped substantially as a triangular prism with rounded vertices, so as to comply with the external radial surface of the rings 520.

The engagement portion 521 has radial holes 522 for fastening it—by means of respective screws—to the rotation shaft 400. Preferably, there is a radial hole 522 for each lateral face of the engagement portion 521. In the embodiment shown in FIGS. 4-6, 8 there are three radial holes 522 (although they are not clearly visible in all views).

The engagement portion 521 also has a through hole 523 shaped to match the outer profile of the end portion 410 of the rotation shaft 400. As can be observed in FIGS. 4, 6, 10, the through hole 523 may have a substantially hexagonal shape.

In one embodiment, for example, the rings 520 may be four; nonetheless, they may also be in a greater or smaller number, depending on the application and on the dimensions of the suction device 100.

It should be noted that, preferably, also the engagement portion 521 is made as one piece with the rings 520 and the supporting wall 530.

The terminal element 500 further comprises a closing element 540 (FIGS. 3, 9), mounted on the side of the rings 210 opposite the cylindrical body 210.

In practical terms, the closing element 540 faces the distal ring 520'' and is mounted to the engagement portion 521.

The closing element 540 comprises an annular portion 541 and a base plate 542.

The annular portion 541 surrounds the engagement portion 521 and has seats 542 to avoid any interference with the fastening screws inserted in the radial holes 522 of the engagement portion 521.

The base plate 542 is positioned under the annular portion 541. The base plate 542 is also annular in shape, with an outer profile substantially coinciding with the radially external profile of the annular portion 541—with an optional taper, as shown in FIG. 3—and an inner profile having a diameter considerably smaller than that of the inner profile of the annular portion 541.

The base plate 542 has a number of through holes 544 for fastening it—by means of respective screws—to the engagement portion 521, in particular through the axial holes 524 formed in the latter.

In light of the above, it can be summarized that: the block including the rings 520, the wall 530 and the engagement portion 521 is integrally fixed to the end portion 410 of the rotation shaft 400; the closing element 540 is integrally fixed to the engagement portion 521.

Therefore, the terminal element 500 (including rings 520, wall 530, engagement portion 521 and closing element 540) is rotated by the rotary actuator 300 via the rotation shaft 400.

The main function of the closing element 540 is to keep substantially regular the mass formed of the rings 520, the wall 530 and the engagement element 521 (which would otherwise show some irregularities caused by the engagement element 521 and by the screws used for fastening it to the rotation shaft 400), so as to reduce the risk that the debris contained in the mud flow (which may sometimes include metal wires) might get entangled and hinder the rotation and/or cause malfunctions.

The suction device 100 further comprises a cleaning device 600 (FIGS. 2-3, 7-8).

The cleaning device 600 is associated with the terminal element 500 to keep the openings 521 clean.

The cleaning device 600 comprises a plurality of protrusions 610, which are substantially integral with the cylindrical body 210.

Each protrusion 610 extends into a respective opening 510, thus cleaning such opening 510 as the terminal element 500 rotates.

In practical terms, since the protrusions 610 are fixed (i.e., integral with the cylindrical body 210) and the openings 510 are in motion (due to the rotation imparted by the rotation shaft 400), the protrusions 610 can remove any debris that may have accumulated in the openings 510, thus keeping them clean and ensuring the proper operation of the suction device as concerns the taking of drilling mud samples.

Preferably, the protrusions 610 extend radially (i.e., in radial directions relative to the circumferential development of the rings 520) into the openings 510. In particular, all the protrusions 610 extend into the openings 510 in one same radial direction. In the embodiment shown in FIG. 7, the protrusions 610 form a sort of comb, the teeth of which are inserted in the openings 510.

In one embodiment, the protrusions 610 extend from a supporting element 620.

Figure 7:
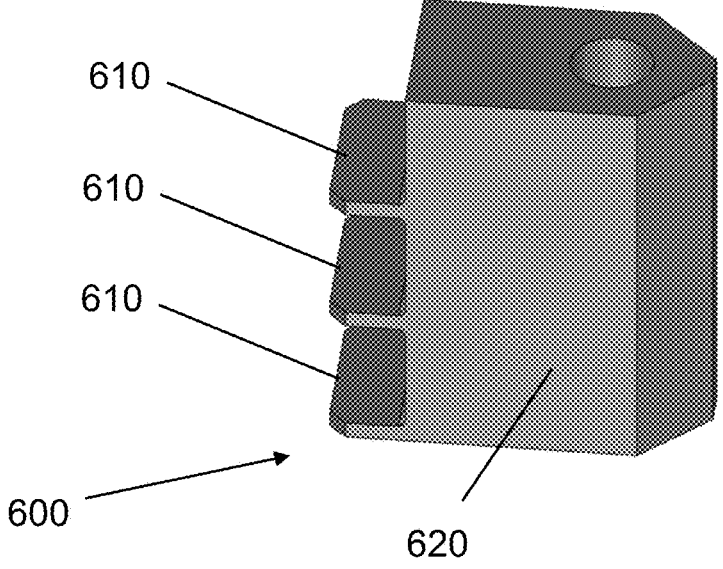
FIG. 7 is a perspective view of another component of the suction device of FIG. 2.
Figures 8, 9:
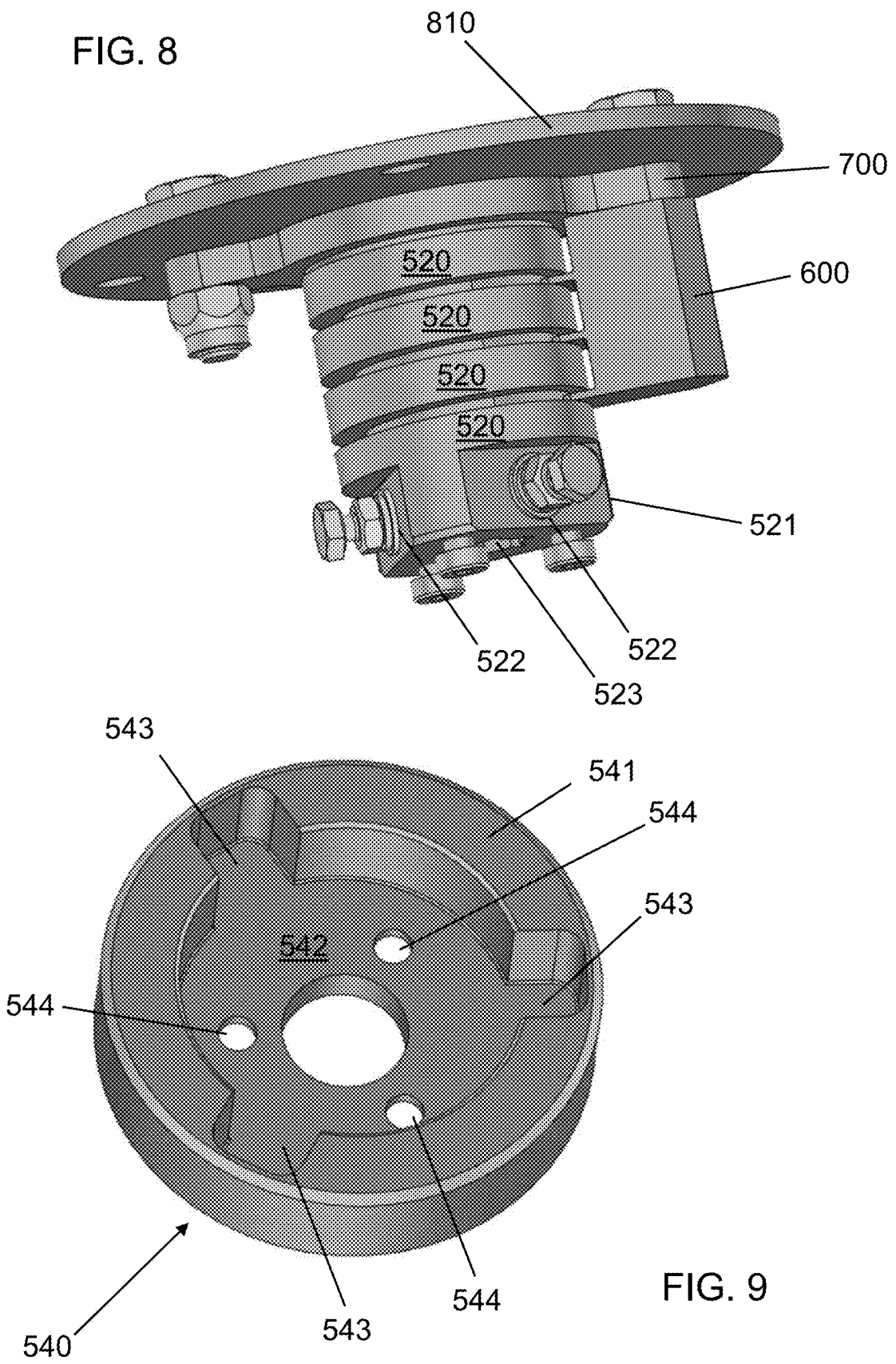
FIG. 8 is a perspective view of a part of the suction device of FIG. 2.
FIG. 9 is a perspective view of a further component of the suction device of FIG. 2.
Figure 10:
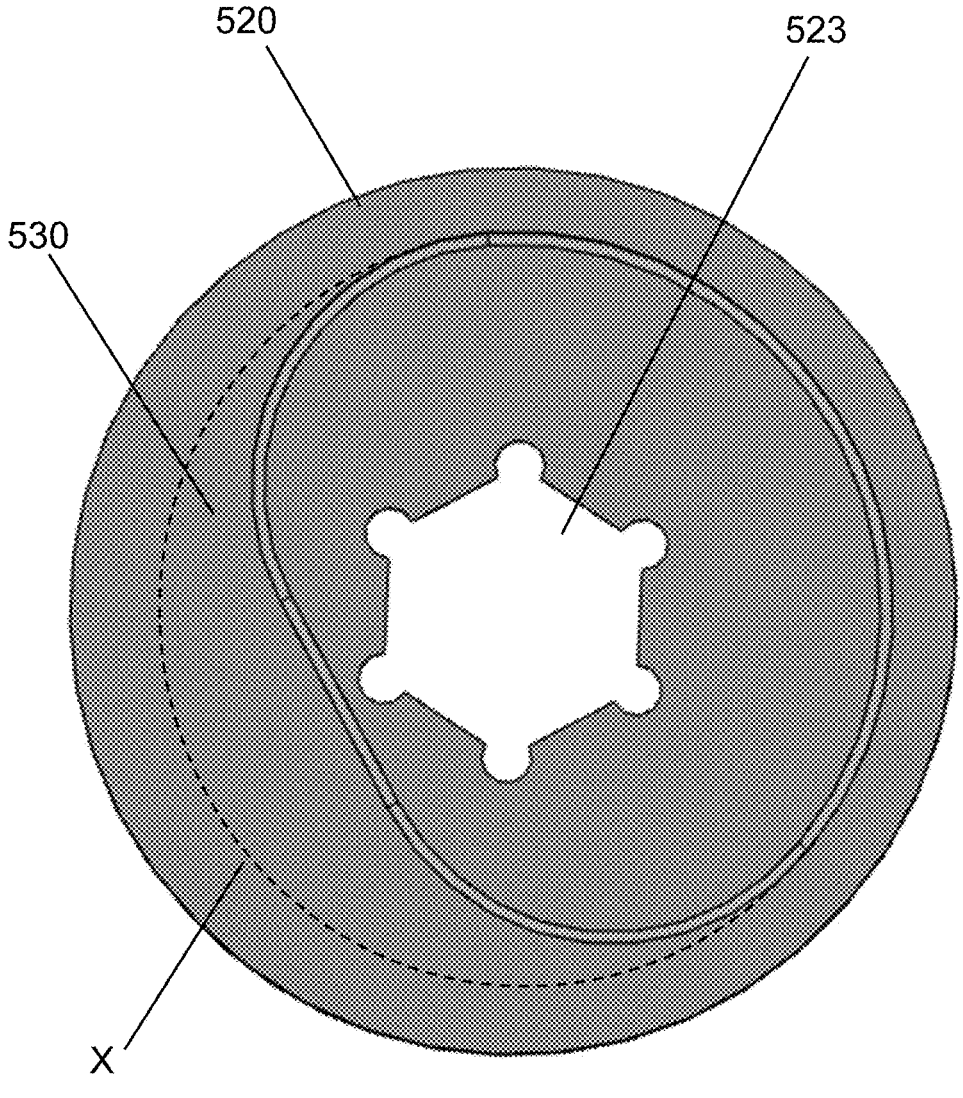
FIG. 10 is a plan view of the component of FIGS. 4-6.

As shown by way of example in FIG. 7, the supporting element 620 may be made as a substantially prismatic block, with its longitudinal axis substantially parallel to the rotation shaft 400.

Each protrusion 610 may have a substantially planar conformation, with a substantially rectangular profile in a plan view. The connection with the supporting element 620 is established at one major side of such substantially rectangular profile. The length of the minor sides defines the extension of each protrusion 610 from the supporting element 620.

Preferably, the supporting element 620 is substantially integral with the cylindrical body 210. More specifically, the supporting element 620 is fixed to a supporting flange 700.

The supporting flange 700 extends radially from an axially terminal portion 211 of the cylindrical body 210.

In one embodiment, the supporting flange 700 is fitted to the axially terminal portion 211 of the cylindrical body 210; preferably, such axially terminal portion 211 has a smaller outside diameter than the remaining part of the cylindrical body 210.

The supporting flange 700 is fixed, e.g., welded, to the axially terminal portion 211 of the cylindrical body 210.

Preferably, the suction device 100 further comprises a top flange 810 and a bottom flange 820.

The top flange 810 is fastened to the supporting flange 700 by means of screws.

The bottom flange 820 is constrained to the top flange 810 by means of columns 830.

Preferably, the columns 830 are constrained to the top flange 810 and to the bottom flange 820 by means of respective screws.

The structure formed of the flanges 810, 820 and the columns 830 performs the function of protecting the terminal element 500 against large debris that may be present in the drilling mud.

The suction device 100 comprises a suction member 110, e.g., a pump.

The suction member 110 is connected to the main body 200, particularly to the cylindrical body 210, by means of a connector 120 (FIG. 2) internally provided with a suitable sealing system.

The suction member 110 is in fluidic communication with the inside of the cylindrical body 210, and hence with the terminal element 500.

When the suction member 110 is activated, the drilling mud in which the terminal element 500 is immersed is sucked through said terminal element 500 and the cylindrical body 210, and then reaches the suction member 110.

From the suction member 100, the drilling mud is delivered to the degassing device 80, so that the gaseous component can be analyzed by the analysis devices 90 and the substantially liquid part can be fed back into the returning mud flow.

It should be noted that the annexed drawings are merely exemplificative and schematically represent some aspects of the invention. The mutual proportions between the various elements shown (or between different dimensions of a single element) are not necessarily real: some dimensions may have been increased/reduced, e.g. for ease of representation.

The invention claimed is:

1. A suction device for drilling muds, comprising:
a main body, having at least one internally hollow cylindrical body;
a rotary actuator connected to said main body;
a rotation shaft extending within said internally hollow cylindrical body, said rotation shaft being operably connected to said rotary actuator and having an end portion axially protruding from said cylindrical body;
a rotatable terminal element mounted on the end portion of said rotation shaft and having a plurality of connected, axially spaced coaxial rings defining a plurality of circumferential openings placing an interior of said rotatable terminal element in fluidic communication with the environment external of the rotatable terminal element interior; and
a fixed cleaning device, arranged externally of the rotatable terminal element, comprising:
a plurality of protrusions substantially integral with said cylindrical body, each protrusion extending into a respective one of said circumferential openings, thus clearing said circumferential openings during a rotation of said rotatable terminal element.

2. The suction device according to claim 1, further comprising:
a suction member in fluidic communication with said main body for sucking drilling fluid into said internally hollow cylindrical body through said circumferential openings when said rotatable terminal element is immersed in said drilling fluid.

3. The suction device according to claim 1, wherein said rotatable terminal element further comprises:
a supporting wall to which each of said axially spaced coaxial rings is attached; and
a closing element, mounted on a side of said axially spaced coaxial rings opposite said internally hollow cylindrical body.

4. The suction device according to claim 3, wherein said axially spaced coaxial rings and said supporting wall are made as one piece.

5. The suction device according to claim 3, wherein said supporting wall extends in a direction parallel to an axis of said rotation shaft between a proximal ring and a distal ring of said axially spaced coaxial rings.

6. The suction device according to claim 3, wherein said supporting wall has, in a plan view, a curved shape which conforms to an internal radial profile of said axially spaced coaxial rings.

7. The suction device according to claim 1, wherein said rotary actuator is an electric motor.

8. The suction device according to claim 1, further comprising a supporting flange extending radially from an axially terminal portion of said internally hollow cylindrical body, wherein said fixed cleaning device comprises a supporting element fixed to said supporting flange, said protrusions extending from said supporting element.

9. The suction device according to claim 1, wherein said protrusions extend radially into said circumferential openings.

10. The suction device according to claim 1, wherein each of said protrusions extend into said circumferential openings in the same radial direction.

11. A survey system for subsoil drilling rigs, comprising:
a suction device for drilling muds, comprising:
a main body, having at least one internally hollow cylindrical body;
a rotary actuator connected to said main body;
a rotation shaft extending within said internally hollow cylindrical body, said rotation shaft being operably connected to said rotary actuator and having an end portion axially protruding from said cylindrical body;
a rotatable terminal element mounted on the end portion of said rotation shaft and having a plurality of connected, axially spaced coaxial rings defining a plurality of circumferential openings placing an interior of said rotatable terminal element in fluidic communication with the environment external of the rotatable terminal element interior; and
a fixed cleaning device, arranged externally of the rotatable terminal element, comprising:
a plurality of protrusions substantially integral with said cylindrical body, each protrusion extending into a respective one of said circumferential openings, thus clearing said circumferential openings during a rotation of said rotatable terminal element;
a degassing device for receiving drilling fluid from the suction device and separating said drilling fluid into a gaseous component and a substantially liquid part; and
one or more analysis devices configured to receive said gaseous component and execute analyses on said gaseous component.

12. A subsoil drilling rig, comprising:
a support structure;
a motorized member;
a drill bit, rotatably activated by said motorized member in order to drill a well;
a structure of pipes connecting said motorized member to said drill bit;
a feeding structure for causing a drilling fluid to flow into said well through said pipes;
a return duct in which said drilling fluid flows as it returns from said well;
a survey system for subsoil drilling rigs, comprising:
a suction device for drilling muds, comprising:
a main body, having at least one internally hollow cylindrical body;
a rotary actuator connected to said main body;
a rotation shaft extending within said internally hollow cylindrical body, said rotation shaft being operably connected to said rotary actuator and having an end portion axially protruding from said cylindrical body;
a rotatable terminal element mounted on the end portion of said rotation shaft and having a plurality of connected, axially spaced coaxial rings defining a plurality of circumferential openings placing an interior of said rotatable terminal element in fluidic communication with the environment external of the rotatable terminal element interior; and a fixed cleaning device, arranged externally of the rotatable terminal element, comprising:

a plurality of protrusions substantially integral with said cylindrical body, each protrusion extending into a respective one of said circumferential openings, thus clearing said circumferential openings during a rotation of said rotatable terminal element;

a degassing device for receiving drilling fluid from the suction device and separating said drilling fluid into a gaseous component and a substantially liquid part; and one or more analysis devices configured to receive said gaseous component and execute analyses on said gaseous component;

wherein said rotatable terminal element is immersed in said drilling fluid returning from said well.

* * * * *